(12) United States Patent
Chandramohan

(10) Patent No.: US 10,146,467 B1
(45) Date of Patent: Dec. 4, 2018

(54) METHOD AND SYSTEM FOR ARCHIVAL LOAD BALANCING

(75) Inventor: Priya Nattamai Chandramohan, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 150 days.

(21) Appl. No.: 13/584,994

(22) Filed: Aug. 14, 2012

(51) Int. Cl.
 *G06F 3/06* (2006.01)

(52) U.S. Cl.
 CPC .......... *G06F 3/0647* (2013.01); *G06F 3/061* (2013.01); *G06F 3/067* (2013.01)

(58) Field of Classification Search
 CPC .......... G06F 17/30221; G06F 3/0647; G06F 17/30153; G06F 17/30067; G06F 3/067; G06F 11/1458; G06F 11/1451; G06F 17/30156; G06F 3/0643; G06F 11/1435; G06F 2003/0697; G06F 17/30079; G06F 11/203; G06F 3/0649; G06F 12/08; G06F 17/30194; H04L 67/1097; H04L 67/06
 See application file for complete search history.

(56) References Cited

U.S. PATENT DOCUMENTS

| | | | | |
|---|---|---|---|---|
| 6,560,719 | B1 * | 5/2003 | Pham et al. | 714/15 |
| 2005/0010918 | A1 * | 1/2005 | Childs | G06F 9/44505 717/174 |
| 2008/0010325 | A1 * | 1/2008 | Yamakawa | 707/204 |
| 2009/0119233 | A1 * | 5/2009 | Dunagan | G06Q 10/04 705/412 |
| 2009/0150449 | A1 * | 6/2009 | McClanahan et al. | 707/200 |
| 2009/0150533 | A1 * | 6/2009 | McClanahan et al. | 709/223 |
| 2009/0249005 | A1 * | 10/2009 | Bender et al. | 711/162 |
| 2009/0300079 | A1 * | 12/2009 | Shitomi | 707/204 |
| 2009/0319532 | A1 * | 12/2009 | Akelbein et al. | 707/10 |
| 2010/0325644 | A1 * | 12/2010 | van der Linden et al. | 719/327 |
| 2011/0167045 | A1 * | 7/2011 | Okamoto | 707/661 |
| 2011/0246430 | A1 * | 10/2011 | Prahlad et al. | 707/679 |
| 2011/0321052 | A1 * | 12/2011 | Long | G06F 9/4843 718/103 |
| 2012/0017075 | A1 * | 1/2012 | Gokhale et al. | 713/100 |
| 2012/0023233 | A1 * | 1/2012 | Okamoto et al. | 709/226 |

(Continued)

OTHER PUBLICATIONS

Windows Server 2008 Bible; Jeffrey R Shapiro; Wiley 2008 p. 344.*

(Continued)

*Primary Examiner* — Reginald G Bragdon
*Assistant Examiner* — Paul M Knight
(74) *Attorney, Agent, or Firm* — Dergosits & Noah LLP; Todd A. Noah

(57) ABSTRACT

Archival load balancing is described. A selection of data stored on a source hard disk drive is received via a user interface. The selection of data stored on the source hard disk drive is associated with data migrated from the source hard disk drive to a backend storage device. Registry keys associated with the selection of data are copied from the source hard disk drive to a target server. Information in the registry keys on the target server is modified to be compatible with settings on the target server. The selection of data is copied from the source hard disk drive to a target hard disk drive on the target server. The selection of data stored on the target hard disk drive is associated with the data migrated to the back end storage device.

16 Claims, 4 Drawing Sheets

(56) References Cited

U.S. PATENT DOCUMENTS

2013/0024426 A1* 1/2013 Flowers .............. G06F 11/1456
 707/654
2014/0006480 A1* 1/2014 Dobrev .................. H04L 67/42
 709/203

OTHER PUBLICATIONS

The Authoritative Dictionary of IEEE Standards Terms; 7th Edition; IEEE 2000 pp. 123, 124, 318, and 446.*
Tweak Now Registry Cleaner; Tweaknow.com/RegCleaner.php on Wayback shot taken Jul. 2011; p. 1.*
Building Software A Practitioner's Guide by Krishnamurthy, and Saran; 2008 Taylor and Francis Group; p. 184 and 190.*
Structure of the Registry, Microsoft; 2011 (Year: 2011).*
How does a System Image differ from a backup of Windows registry by Rathbone Mar. 2012 (Year: 2012).*
Windows 7 Backup Does the system image include all the files on my drive by Hinkle 2011 (Year: 2011).*
US PCT: PCTUS1028942 (Year: 2010).*

* cited by examiner

METHOD AND SYSTEM FOR ARCHIVAL LOAD BALANCING

BACKGROUND

EMC Corporation's DiskXtender® is an automated, policy-based, file system-centric solution for migrating inactive data off higher-cost storage to lower-cost disk, tape, or optical devices. In many environments, a majority of data can be categorized as inactive because the data is either not modified or accessed for a long period of time, but the data is still stored on primary storage. This inactive data may result in a growth in capacity for production storage, which increase costs for storage, protection, disaster recovery and management. DiskXtender® implements a file-system filter driver that intercepts user mode Input/Output requests. These intercepted requests are then processed by DiskXtender® components, which are capable of detecting inactive data and migrating the inactive data to secondary and/or tertiary storage with lower costs while still maintaining transparency to both applications and end users. Applications and end users have full visibility of migrated data, and the migrated data will either be redirected to users and applications or copied back to the production system when access is requested. When necessary, files are fetched off of secondary storage media and then passed back to the calling applications. Otherwise, if no processing is necessary, the filter driver does nothing and simply passes the request through the stack of lower level drivers. A hard disk drive for which DiskXtender® migrated inactive data to secondary storage is referred to as an extended drive, while directories on the extended drive that DiskXtender® manages are referred to as media folders.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
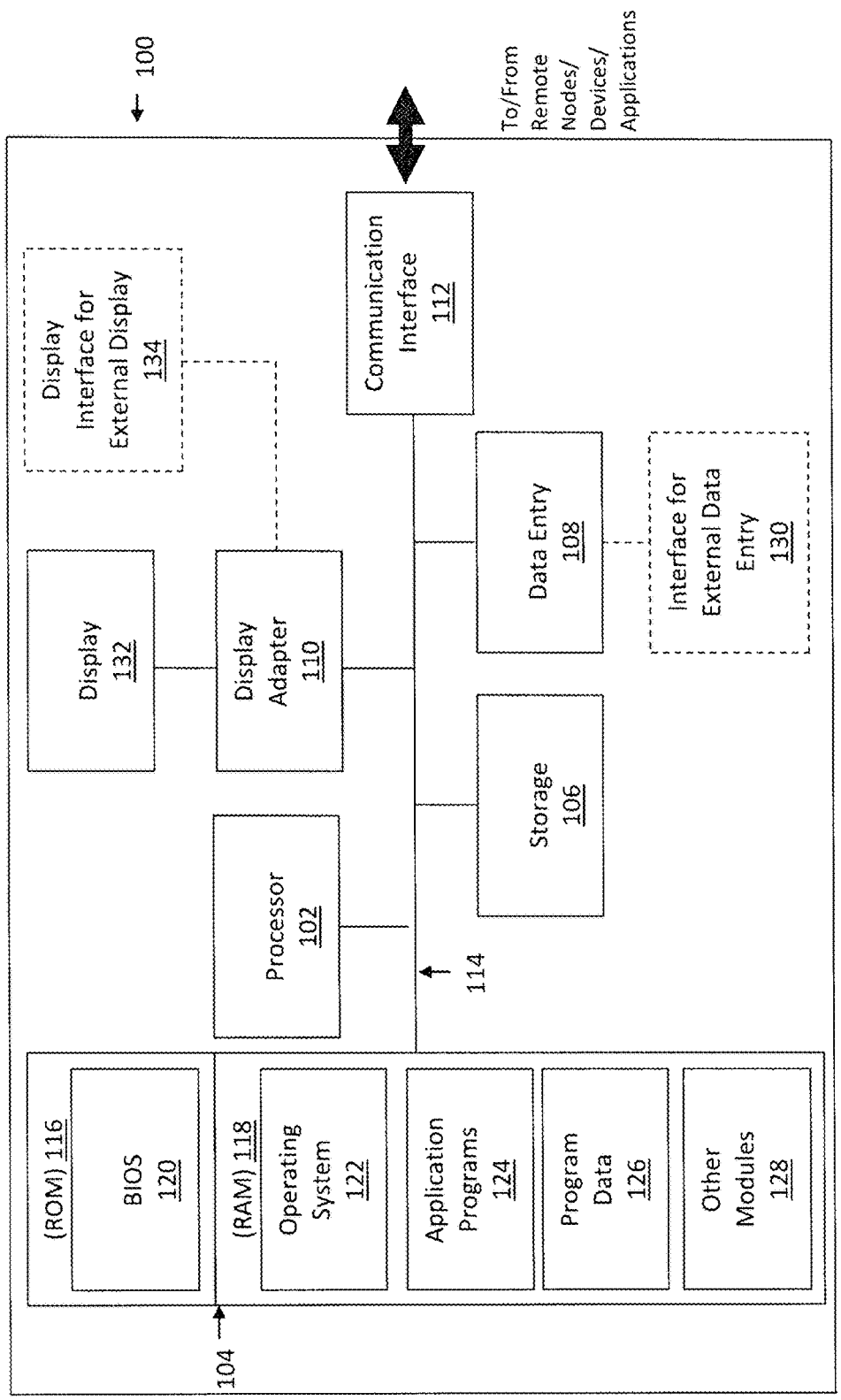
FIG. 1 is a block diagram illustrating an example hardware device in which the subject matter may be implemented.

The subject matter presented herein provides archival load balancing. Commonly owned U.S. Pat. Nos. 5,359,713; 5,519,853; 5,649,152; 5,799,141; 5,812,748; 5,835,953; 5,978,565; 6,073,222; 6,085,298; 6,145,089; 6,308,283; 6,324,654; and 6,338,126 enable EMC Corporation's DiskXtender®, and are incorporated in their entirety herein for all purposes. While DiskXtender®provides many solutions to prior art problems, these current solutions may not be optimal for all circumstances, situations, and conditions. For example, when many extended drives are on the same server, bottlenecks and latency issues may arise. In another example, when many files are stored on an extended drive over time, the amount of data stored on the extended drive may exceeded best practice limits. In yet another example, when the archiving needs of many departments in a company are provided on a single server, the rapid increase in data size and the need to address service level objectives for each department may make the storing of all data on a single server less than optimal.

A system user may address any of these situations by redistributing data on a server's extended drive(s) to another hard disk drive with greater capacity or to multiple hard disk drives, which may reside on the same server as the extended disk or on multiple servers, thereby balancing the archival load among different hard disk drives and servers. The system user first re-migrates all of the data that was migrated from the extended disk drive to secondary storage back from the secondary storage to the original hard disk drive, which becomes a source hard disk drive. This initial step may be difficult if the original hard disk drive does not retain enough free space to store the migrated data, which would result in the need to remove some of the data stored on the original hard disk drive. Once all of the migrated data has been re-migrated back to the source disk drive, the user removes the DiskXtender® related meta data from the data stored on the source hard disk drive. Next, the user copies whatever data the user wants to redistribute from the source hard disk drive to the target hard disk drive. Then the user initiates data migration for the target hard disk drive, and for the source hard disk drive if the user retained any data on the source disk drive. The processes of re-migrating the data from the secondary storage back to the original hard disk drive and then migrating the storage from the target hard disk drive (and possibly the source hard disk drive) a second time to secondary storage are time consuming, and may require the creation of additional space on the original hard disk drive. Furthermore, compliance and audit tracking of the data being re-migrated to the original hard disk drive, to the target hard disk drive, and then migrated a second time to secondary storage may create many challenges for users such as information technology administrators.

Embodiments herein enable archival load balancing without the need to re-migrate data from secondary storage back to the original hard disk drive or the need to migrate the data to secondary storage a second time. The system receives a user selection of data stored on an extended drive for migration to a target server. The system copies registry keys associated with the selection of data from the source hard disk drive to a target server. Then the system modifies information in the registry keys on the target server to be compatible with settings on the target server. After the registry keys have been copied to and corrected on the target server, the system copies the selection of data from the source hard disk drive to a target hard disk drive on the target server. Now the target hard disk drive not only stores the data previously stored on the source hard disk drive, but the registry keys and the data stored on the target hard disk drive enable the target hard disk drive to function as a new extended drive that transparently accesses all of the data that was migrated from the source hard disk drive to the secondary storage. This process is not time consuming because no data is re-migrated to the original hard disk drive, and data is not migrated a second time to the secondary storage, and no additional space needs to be cleared on the extended drive.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAM-BUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVDTM), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for client-server communication in a cached communication environment.

The subject matter presented herein provides archival load balancing. The prior art processes of re-migrating the data from the secondary storage back to the original hard disk drive and then migrating data from the target hard disk drive (and possibly the source hard disk drive) a second time to secondary storage are time consuming, and may require the creation of additional space on the original hard disk drive. Furthermore, compliance and audit tracking of the data being re-migrated to the original hard disk drive, to the target hard disk drive, and then migrated a second time to secondary storage may create many challenges for users such as information technology administrators. Embodiments herein enable archival load balancing by copying registry keys associated with the selection of data from a source hard disk drive to a target server, and then modifying information in the registry keys on the target server to be compatible with settings on the target server.

Figure 2:
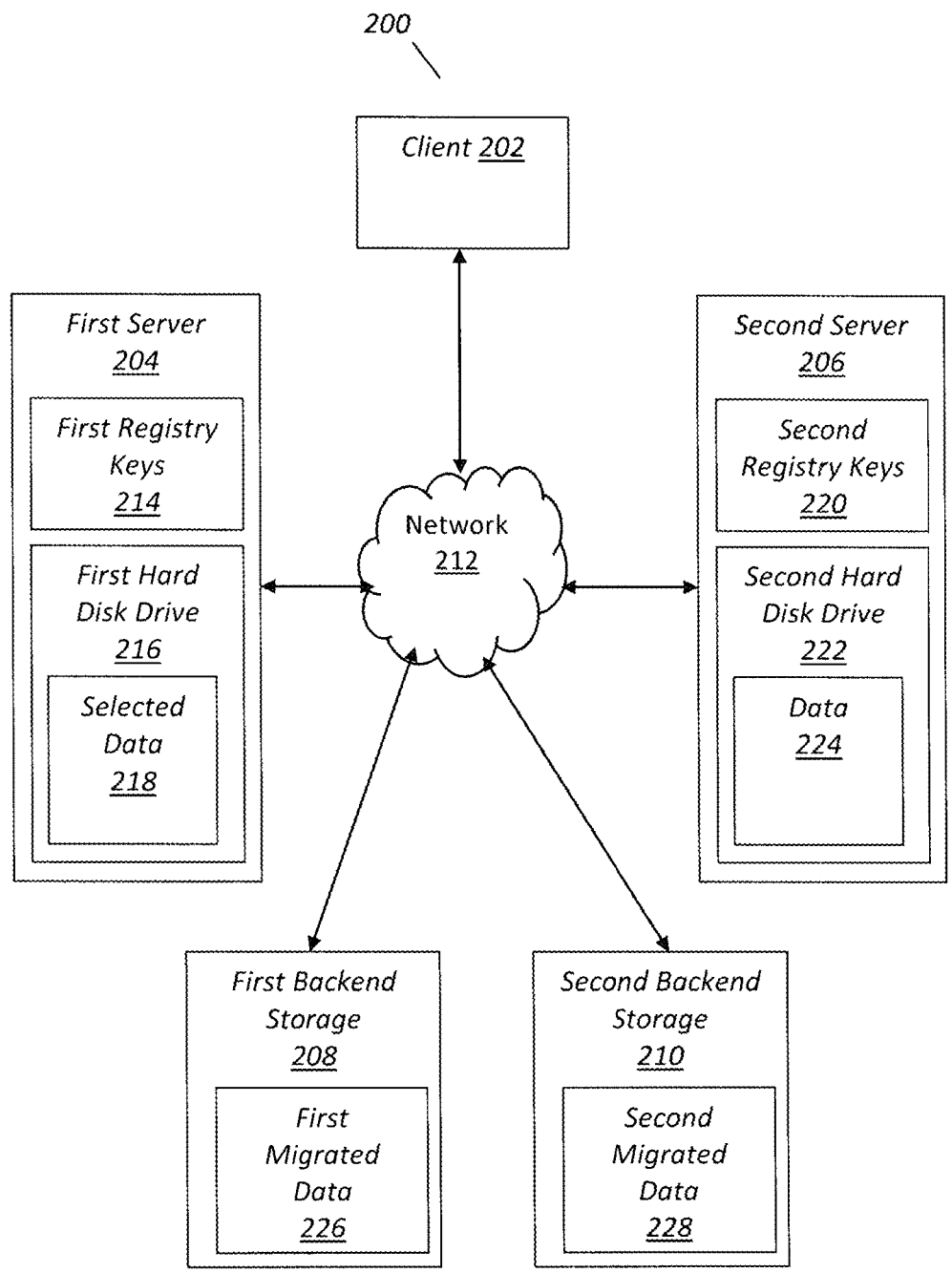
FIG. 2 illustrates a block diagram of an example system for archival load balancing, under an embodiment.

FIG. 2 illustrates a block diagram of a system that implements archival load balancing, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202, a first server 204, a second server 206, a first backend storage 208, and a second backend storage 210, that are provided by a hosting company and which communicate via a network 212. Although FIG. 2 depicts the system 200 with one client 202, two servers 204-206, two backend storages 208-210, and one network 212, the system 200 may include any number of clients 202, servers 204-206, backend storages 208-210, and networks 212. The client 202 and the servers 204-206 may each be substantially similar to the system 100 depicted in FIG. 1.

The first server 204 includes first registry keys 214 and first hard disk drive 216. The first hard disk drive 216 includes selected data 218. The second server 206 includes second registry keys 220 and second hard disk drive 222. The second hard disk drive 222 includes data 224. The first backend storage 208 includes first migrated data 226. The second backend storage 210 includes second migrated data 228. The first backend storage 208 and/or the second backend storage 210 may be provided by disk(s), cloud storage(s), and network-attached storage(s).

The system 200 receives a user selection of data stored on an extended drive for migration to a target server. For example, a user enters information into the client 202 to identify the selected data 218 as data stored on the first hard disk drive 216, which is an extended drive that previously migrated the first migrated data 226 to the first backend storage 208, as data to be migrated to a target server, which is the second server 206. The second server 206 includes the second hard disk drive 222, which is an extended drive that previously migrated the second migrated data 228 to the second backend storage 210. Although this example describes the second hard disk drive 222 functioning as an extended drive that migrated the second migrated data 228 to the second backend storage 210, the second hard disk drive 222 may have previously migrated data to the first backend storage 208 because the same secondary storage may store migrated data for multiple extended drives. Since the second hard disk drive 222 is an extended drive, the second server 206 is already configured to migrate data to secondary storage.

The selection of data stored on the source hard disk drive may be all of the data stored on the source hard disk drive or a directory of data stored on the source hard disk drive. For example, if many files are stored on an extended drive over time, and the amount of data stored on the extended drive exceeds best practice limits, a user may select to transfer all of the data stored on a source hard disk drive to a target hard disk drive that provides significantly greater storage capacity than the source hard disk drive provides. In another example, when the archiving needs of many departments in a company are provided on a single server, a user may address the rapid increase in data size and the need to address service level objectives for each department by selecting to migrate the media folder stored on the source hard disk drive for the accounting department to one server, the media folder stored on the source hard disk drive for the sales department to another server, and the media folder stored on the source hard disk drive for the collections department to yet another folder.

The selection of data stored on the source hard disk drive may include references to the data migrated from the source hard disk drive to a back end storage device. For example, the selected data 218 may include "stubs" where the first migrated data 226 was originally stored on the first hard disk drive 216, and which include pointers to the first migrated data 226 stored on the first backend storage 208.

The system halts a service that migrated the data from the source hard disk drive to the back end storage device. For example, the system 200 temporarily halts the DiskXtender® process so that the system may handle a temporarily static storage environment, without any migrations of data to secondary storage or the fetching of migrated data from secondary storage in response to user requests for the migrated data.

If the selected data that the system 200 is migrating is only a subset of all media folders, instead of migrating all of the data on a source hard disk drive, the system 200 flushes all pending file activities associated with the selection of data stored on the source hard disk drive to a queue and executes all pending file activities associated with the selection of data stored on the source hard disk drive. Files activities include renaming a file, deleting a file, etc. Since each hard disk drive has a single queue for handling file activities, such a step would be unnecessary when migrating all of the data stored on a hard disk drive because the entire queue would be copied with all of the data on the source hard disk drive to the target server, such that the target server could execute all of the pending file activities for all media folders migrated to the target hard disk drive. However, since the pending file activities queue may include pending activities for media files that will not be migrated to the target server, as well as pending activities for media files that will be migrated to the target server, the system 200 identifies and executes all of the pending file activities for any isolated media folders that a user selected to be migrated to the target server.

The system 200 copies registry keys associated with the selection of data from the source hard disk drive to a target server. For example, the system 200 copies the first registry keys 214 associated with the selected data 218 to the second registry keys 220. The registry keys associated with the selection of data includes information associated with the source hard disk drive, such as a volume serial number, and a drive letter identifier. Copying the registry keys from the source hard disk drive to the target server enables a hard disk drive on the target server to function as the extended drive that the source hard disk drive previously functioned as.

The system 200 modifies information in the registry keys on the target server to be compatible with settings on the target server. For example, the system 200 modifies the volume serial number in the first registry keys 214 copied to the second registry keys 220 to reflect the volume serial number of the second hard disk drive 222 instead of the volume serial number of the first hard disk drive 216.

After the registry keys have been copied to and corrected on the target server, the system 200 copies the selection of data from the source hard disk drive to a target hard disk drive on the target server. For example, the system 200 copies the selected data 218 from the first hard disk drive 216 to the target server 206. The system 200 also copies an extended media service key; (an example of an extended media service key is the product key for DiskXtender®) that enables migration to secondary storage, from the source hard disk drive to the target server. The system 200 also sets extended attributes for the selection of data stored on the target hard disk drive. For example, the system 200 sets an extended attribute for a document that was copied with the selected data 218, which identifies the author of the document.

If the source hard disk drive is a source external disk drive, the system 200 outputs, via a user interface, a prompt to migrate the source external disk drive from a source server to the target server, instead of copying the selection of data. For example, the system 200 requests a system administrator to transfer the external hard disk drive 216 from the first server 204 to the second server 206. After transfer, the transferred external disk drive will continue to function as an extended disk, with requests directed to the transferred external disk drive continuing to access the same migrated data stored on secondary storage, whenever needed. When the transfer of the external disk drive is completed, the system 200 receives, via the user interface, a notification that the source external disk drive is migrated from the source server to the target server.

The target hard disk drive not only stores the selection of data previously stored on the source hard disk drive, but the registry keys and the data stored on the target hard disk drive enable the target hard disk drive to function as a new extended drive that transparently accesses all of the data that was migrated from the source hard disk drive to the secondary storage. However, the redistribution process is not fully completed until the system 200 prepares the source hard disk drive for subsequent use. For example, the system 200 resets the first registry keys 214 for the selected data previously stored on first hard disk drive 216, deletes the selection of data 218 from the first hard disk drive 216, and restarts the DiskXtender® service.

Embodiments herein enable archival load balancing without the need to re-migrate data from secondary storage back to the original hard disk drive or the need to migrate the data to secondary storage a second time. The embodiments provide processes that are not time consuming because no data is re-migrated to the original hard disk drive, data is not migrated a second time to the secondary storage, and no additional space needs to be cleared on an extended drive.

Figure 3:
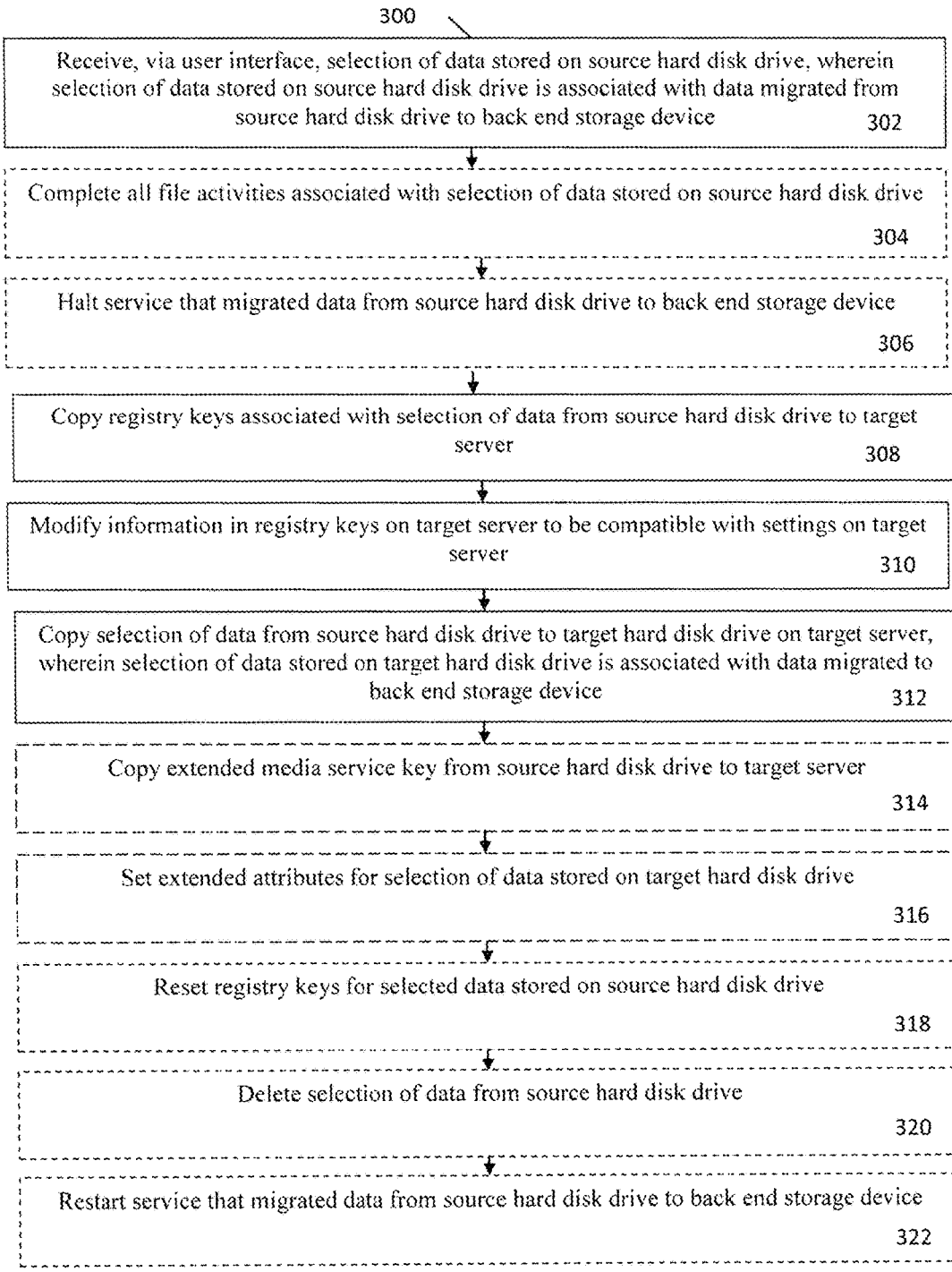
FIG. 3 is a flowchart that illustrates a method of archival load balancing, under an embodiment.

FIG. 3 is a flowchart that illustrates a method of archival load balancing. Flowchart 300 illustrates method acts illustrated as flowchart blocks for certain steps involved in and between the client 202 and the servers 204-206 of FIG. 2.

A selection of data stored on a source hard disk drive is received via a user interface, wherein the selection of data stored on the source hard disk drive is associated with data migrated from the source hard disk drive to a back end storage device, act 302. For example, a user enters information through the client 202 to identify data stored on the first hard disk drive 216 as the selected data 218 to be migrated to a target server, which is the second server 206, where the first hard disk drive 216 is an extended drive that previously migrated the first migrated data 226 to the first backend storage 208.

All file activities associated with the selection of data stored on the source hard disk drive are optionally completed, act 304. For example, the system 200 identifies and executes all of the pending file activities for any isolated media folders selected by the user to be migrated to the target server A service that migrated data from a source hard disk drive to a back end storage device is optionally halted, act 306. For example, the system 200 temporarily halts the DiskXtender® process.

Registry keys associated with a selection of data are copied from a source hard disk drive to a target server, act 308. For example, the system 200 copies the first registry keys 214 associated with the selected data 218 to the second registry keys 220.

Information in registry keys on a target server is modified to be compatible with settings on a target server, act 310. For example, the system 200 modifies the volume serial number in the first registry keys 214 copied to the second registry keys 220 to reflect the volume serial number of the second hard disk drive 222 instead of the volume serial number of the first hard disk drive 216.

A selection of data is copied from a source hard disk drive to a target hard disk drive on a target server, wherein the selection of data stored on the target hard disk drive is associated with data migrated to a back end storage device, act 312. For example, the system 200 copies the selected data 218 from the first hard disk drive 216 to the target server 206.

An extended media service key is optionally copied from a source hard disk drive to a target server, act 314. For example system 200 copies an extended media service key, which is the product key for DiskXtender® that enables migration of data to secondary storage, from the source hard disk drive to the target server.

Extended attributes are optionally set for a selection of data stored on a target hard disk drive, act 316. For example, the system 200 sets an extended attribute for a document that was copied with the selected data 218, which identifies the author of the document.

Registry keys are optionally reset for selected data previously stored on the source hard disk drive, act 318. For example, the system 200 resets the first registry keys 214 for the selected data previously stored on the first hard disk drive 216.

A selection of data is optionally deleted from a source hard disk drive, act 320. For example, the system 200 deletes the selection of data 218 from the first hard disk drive 216.

A service that migrated data from a source hard disk drive to a back end storage device is optionally restarted, act 322. For example, the system 200 restarts the DiskXtender® service.

Although FIG. 3 depicts the acts 302-322 occurring in a specific order, the acts 302-322 may occur in another order. The Flowchart 300 describes a process that is not time consuming because no data is re-migrated to the original hard disk drive, data is not migrated a second time to the secondary storage, and no additional space needs to be cleared on the extended drive.

Figure 4:
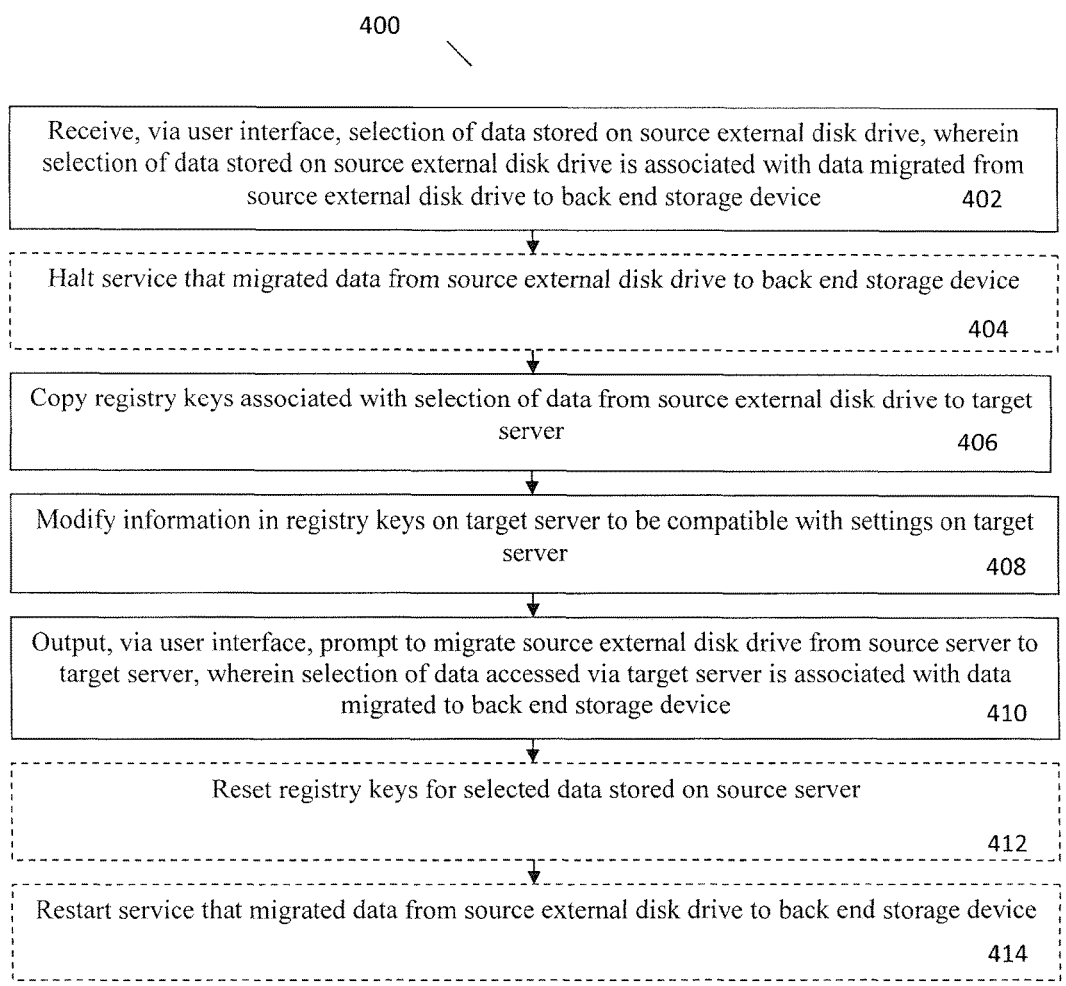
FIG. 4 is a flowchart that illustrates another method of archival load balancing, under an embodiment.

FIG. 4 is a flowchart that illustrates another method of archival load balancing. Flowchart 400 illustrates method acts illustrated as flowchart blocks for certain steps involved in and between the client 202 and the servers 204-206 of FIG. 2. Flowchart 400 is substantially similar to Flowchart 300, but involves a source external disk drive rather than a source hard disk drive.

A selection of data stored on a source external disk drive is received via a user interface, wherein the selection of data stored on the source external disk drive is associated with data migrated from the source external disk drive to a back end storage device, act 402. For example, a user enters information through the client 202 to identify data stored on the first external disk drive 216 as the selected data 218 to be migrated to a target server, which is the second server 206, where the first external disk drive 216 is an extended drive that previously migrated the first migrated data 226 to the first backend storage 208.

A service that migrated data from a source external disk drive to a back end storage device is optionally halted, act 404. For example, the system 200 temporarily halts the DiskXtender® process.

Registry keys associated with a selection of data are copied from a source external disk drive to a target server, act 406. For example, the system 200 copies the first registry keys 214 associated with the selected data 218 to the second registry keys 220.

Information in registry keys on a target server is modified to be compatible with settings on a target server, act 408. For example, the system 200 modifies the volume serial number in the first registry keys 214 copied to the second registry keys 220 to reflect the volume serial number of the second hard disk drive 222 instead of the volume serial number of the first external disk drive 216.

A prompt to migrate a source external disk drive from a source server to a target server is output via a user interface, wherein a selection of data accessed via the target server is associated with data migrated to a back end storage device, act 410. For example, the system 200 requests a system administrator to transfer the first external disk drive 216 from the first server 204 to the second server 206.

Registry keys are optionally reset for selected data previously stored on the source server, act 412. For example, the system 200 resets the first registry keys 214 for the selected data previously stored on the first server 204.

A service that migrated data from a source external disk drive to a back end storage device is optionally restarted, act 414. For example, the system 200 restarts the DiskXtender® service.

Although FIG. 4 depicts the acts 402-414 occurring in a specific order, the acts 402-414 may occur in another order. The Flowchart 400 describes a process that is not time consuming because no data is re-migrated to the original external disk drive, data is not migrated a second time to the secondary storage, and no additional space needs to be cleared on the extended drive.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, ay combination of the above-described elements in all possible variations thereof is encompassed unless otherwise indicated herein or otherwise clearly contradicted by context.

What is claimed is:

1. A system for archival load balancing, the system comprising:
   a processor-based application, which when executed on a computer, will cause the processor to:
   receive, via a user interface, a selection of data stored on a source hard disk drive, wherein the selection of data stored on the source hard disk drive is associated with data migrated from the source hard disk drive to a back end storage device, the source hard disk drive being an extended drive of a first server;
   halt, after receiving the selection of data, a service that has previously migrated the data from the source hard disk drive to the back end storage device, the halting comprising preventing the service from further migrating data from the source hard disk drive to the back end storage device and preventing the service from fetching the migrated data from the back end storage device in response to a user request for the migrated data;
   copy registry keys associated with the selection of data from the first server to a target server;
   modify information in the registry keys on the target server to be compatible with settings on the target server, the modifying comprising changing a reference within the information from the source hard disk drive to a target hard disk drive, the modified registry keys allowing the target hard disk drive to function as an extended drive of the target server;
   copy the selection of data from the source hard disk drive to the target hard disk drive on the target server after the registry keys associated with the selection of data have been copied and modified, wherein the selection of data stored on the target hard disk drive is associated with the data migrated to the back end storage device, the modified registry keys and copied selection of data stored on the target hard drive such that the modified registry keys allow access to the data migrated from the source hard disk to the back end storage device without moving the migrated data;
   delete, after the selection of data has been copied, the selection of data from the source hard disk drive while retaining the copy of the selection of the data on the target hard disk drive; and
   restart the halted service that migrated the data from the source hard disk drive to the back end storage device.

2. The system of claim 1, wherein the selection of data stored on the source hard disk drive comprises all of the data stored on the source hard disk drive.

3. The system of claim 1, wherein the selection of data stored on the source hard disk drive comprises references to the data migrated from the source hard disk drive to a back end storage device.

4. The system of claim 1 wherein the back end storage device is at least one of a disk, a cloud storage, and a network-attached storage.

5. The system of claim 1 wherein the registry keys associated with the selection of data comprise information associated with the source hard disk drive.

6. The system of claim 1 wherein the target server is associated with a service for migrating data from a target hard disk drive on the target server to a second back end storage device.

7. The system of claim 1 wherein the processor-based application when executed on a computer, will further cause the processor to copy an extended media service key from the source hard disk drive to the target server.

8. The system of claim 1, wherein the processor-based application when executed on a computer, will further cause the processor set extended attributes for the selection of data stored on the target hard disk drive.

9. The system of claim 1, wherein the processor-based application when executed on a computer, will further cause the processor to reset the registry keys for the selected data previously stored on the source hard disk drive.

10. The system of claim 1 wherein the processor-based application when executed on a computer, will further cause the processor to restart a service that migrated the data from the source hard disk drive to a back end storage device.

11. A computer-implemented method for archival load balancing, the method comprising:
    receiving, via a user interface, a selection of data stored on a source hard disk drive, wherein the selection of data stored on the source hard disk drive is associated with data migrated from the source hard disk drive to a back end storage device the source hard disk drive being an extended drive of a first server;
    halting a service that has previously migrated the data from the source hard disk drive to the back end storage, the halting comprising preventing the service from further migrating data from the source hard disk drive to the back end storage device and preventing the service from fetching the migrated data from the back end storage device in response to a user request for the migrated data;
    completing all file activities associated with the selection of data stored on the source hard disk drive;
    copying registry keys associated with the selection of data from the first server to a target server;
    modifying information in the registry keys on the target server to be compatible with settings on the target server, the modifying comprising changing a reference within the information from the source hard disk drive to a target hard disk drive, the modified registry keys allowing the target hard disk drive to function as an extended drive of the target server;
    copying the selection of data from the source hard disk drive to the target hard disk drive on the target server after the registry keys associated with the selection of data have been copied and modified, wherein the selection of data stored on the target hard disk drive is associated with the data migrated to the back end storage device, the modified registry keys and copied selection of data stored on the target hard drive such that the modified registry keys allow access to the data migrated from the source hard disk to the back end storage device without moving the migrated data; and deleting, after the selection of data has been copied, the selection of data from the source hard disk drive while retaining the copy of the selection of the data on the target hard disk drive; and restarting the halted service that migrated the data from the source hard disk drive to a back end storage device.

12. The method of claim 11, wherein the selection of data stored on the source hard disk drive comprises a directory of data stored on the source hard disk drive.

13. The method of claim 11, wherein completing all file activities associated with the selection of data stored on the source hard disk drive comprises flushing all file activities associated with the selection of data stored on the source hard disk drive to a queue.

14. A computer program product comprising computer-readable program code to be executed by one or more processors when retrieved from a non-transitory computer-readable medium, the program code including instructions to:

receive, via a user interface, a selection of data stored on an external disk drive, wherein the selection of data stored on the external disk drive is associated with data migrated from the external disk drive to a back end storage device, the external disk drive being an extended drive of a first server;

halt, after receiving the selection of data, a service that has previously migrated the data from the external disk drive to the back end storage, the halting comprising preventing the service from further migrating data from the external disk drive to the back end storage device and preventing the service from fetching the migrated data from the back end storage device in response to a user request for the migrated data;

copy registry keys associated with the selection of data from a source server to a target server;

modify information in the registry keys on the target server to be compatible with settings on the target server, the modified registry keys allowing the external disk drive to function as an extended drive of the target server;

output, via a user interface, a prompt to migrate the external disk drive from the source server to the target server after the registry keys associated with the selection of data have been copied and modified; and restart the halted service that migrated the data from the external disk drive to the back end storage device.

15. The computer program product of claim 14, the program code including further instructions to receive, via the user interface, a notification that the external disk drive is migrated from the source server to the target server.

16. The computer program product of claim 14, program code including further instructions to reset the registry keys for the selected data previously associated with the source server.

* * * * *